United States Patent

[11] 3,584,923

[72] Inventor Andre Frans Goossens
 Waasmunster-Sombeke, Belgium
[21] Appl. No. 1,161
[22] Filed Jan. 7, 1970
[45] Patented June 15, 1971
[73] Assignee The Singer Company
 Rochester, N.Y.

[54] BEARING DEVICE
 3 Claims, 8 Drawing Figs.
[52] U.S. Cl. ................................................ 308/15
[51] Int. Cl. ............................................. F16c 35/02
[50] Field of Search ............................. 308/26, 15, 22

[56] References Cited
UNITED STATES PATENTS
1,188,949  6/1916  Koehler........................ 308/RB

*Primary Examiner*—Martin P. Schwadron
*Assistant Examiner*—Frank Susko
*Attorneys*—George W. Killian, Patrick J. Schlesinger, Charles R. Lepchinsky and Jay M. Cantor ABSTRACT: A bearing device is disclosed wherein a bearing having sidewalls straddles a slot of a chassis for supporting the bearing and a bifurcated spring member coacts with opposed wedgelike openings communicating with the slot and proximal to the straddled bearing to lock the bearing in a desired position by a double lever action of the bifurcated spring member.

PATENTED JUN 15 1971

3,584,923

INVENTOR
ANDRE GOOSSENS
BY George W. Killian
AGENT 3,584,923

BEARING DEVICE

BACKGROUND OF THE INVENTION

1. Field of Invention

The present invention relates to a bearing structure and more particularly to a bearing device particularly suited for mounting on relatively thin-walled chassis structures. The bearing device permits a large number of bearing arrangements since assembly of the bearing device to the chassis structure may be accomplished axially as well as transversely to a given shaft quickly, economically and efficiently at a cost lower than prior art bearing devices.

2. Prior Art

In the past many business machines and electronic equipment have used castings for chassis and frames for supporting components and rotatable shafts thereon. Such castings generally provided bearing mounting holes of close tolerance for the press fit of bearing devices therein. Within the more recent past the use of welded thin-walled structures and chassis have replaced the castings because of lightness, economy and size. However, even though these thin-walled chassis structures were employed, the bearing device still had to be assembled in the usual press fit manner. One of the major problems in the press fitting of a bearing device is that the bearing device may close and therefore the shaft may not fit the bearing unless additional operations such as reaming or sizing are applied to the bearing device. This is submitted to be a problem of long standing in the art.

SUMMARY OF THE INVENTION

Briefly described, the present invention in a preferred embodiment of the bearing device includes a bearing having sidewalls which straddle a slot of a chassis at one end thereof. The chassis includes opposed wedgelike openings communicating with the slot and proximal to the straddled bearing at the one end thereof. The wedgelike openings are disposed above the center of the bearing. Coacting with the wedgelike openings and insertable between the sidewalls of the bearing is a bifurcated spring member which is insertable transversely to the axis of the bearing and within the plane of the slot of the chassis. The bearing is also insertable within the plane of the slot. The spring member functions as a double lever to lock the bearing in the desired position.

DESCRIPTION OF THE DRAWING

The invention both as to its organization and method of operation will best be understood by reference to the following detailed description taken in connection with the accompanying drawing in which.

DETAILED DESCRIPTION

Figure 6:
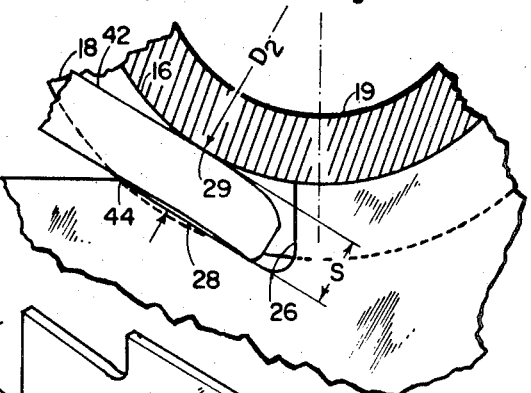
FIG. 6 is a fragmentary enlarged sectional view taken along line 6—6 of the bearing device of FIGS. 1 and 2.
Figure 7:
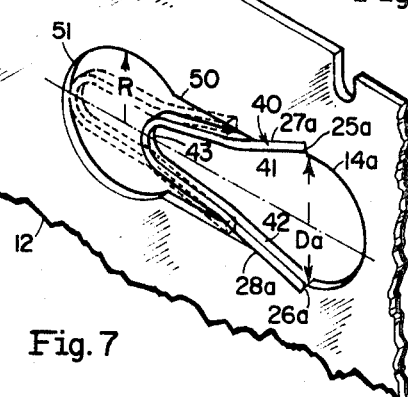
FIG. 7 is a perspective view of the bearing device of FIG. 1 mounted in a section of chassis which also includes means for the mounting of another bearing device in accordance with the invention from within the chassis rather from an edge of the chassis.
Figure 8:
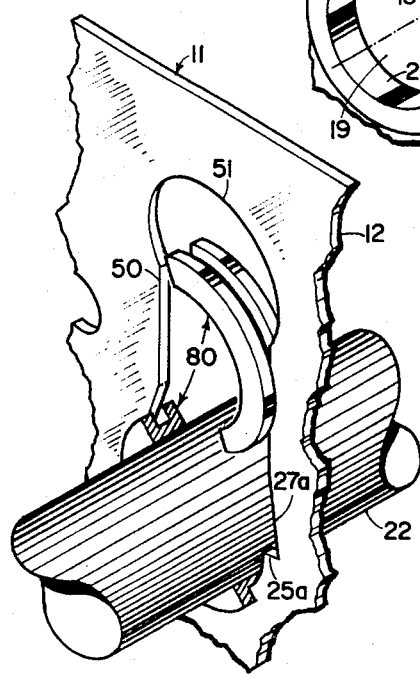
FIG. 8 is another perspective enlarged view showing a split bearing for use with the invention shown in FIG. 7.

Referring to the figures and characters of record and in particular to FIGS. 1—7, a preferred embodiment of the invention is shown in a bearing device 10. Like reference numerals are used throughout the figures to designate like structural elements. The bearing device 10 is particularly suited for use with a chassis or frame 11 having at least one plate or relatively thin bearing wall member 12. The support member 12 includes a slot 13 which terminates at one end 14 for receiving a bearing 15 therein. The bearing 15 includes an annular groove 16 disposed between opposed sidewall portions 17 and 18 (FIG. 7). The annular groove 16 in the bearing 15 has a diameter D which is slightly less than the width W of the slot 13 so that the bearing 15 is slideable within the slot 13 in the support member 12. The wall portions 17 and 18 of the bearing 15 are spaced apart to receive the support member 12 therebetween. The wall portions 17 and 18 of the bearing 15 provide lateral support of the bearing 15 and render the bearing 15 captive within the slot 13 laterally. The bearing 15 includes a shaft bearing bore 19 having a bearing surface 21. The bore 19 may be made to any suitable size to accept a shaft such as rotatable shaft 22 (FIG. 8).

The end 14 of the slot 13 has a contour corresponding to that of the annular groove 16. That is, for the bearing 15 the contour of the end 14 of the slot 13 is circular, however, it should be understood that other contours may be used such as a rectangular contour so as to prevent a turning of the bearing 15 within the end 14 of the slot 13 without departing from the invention.

As was mentioned above, the annular groove 16 of the bearing 15 has a circular shape and thus has a centerline 23 and a diameter D. The end of the slot 13 also has a semicircular contour and thus has a corresponding centerline 23a similar to centerline 23 normal to a longitudinal axis 24 of the slot 13. In accordance with the invention, the bearing support member 12 includes opposed wedgelike openings 25 and 26 communicating with the slot 13 and disposed proximal to the centerline 23a. Since the centerlines 23 and 23a are coincident when the bearing 15 is disposed in the slot 13 at the end 14 thereof the opposed wedgelike openings 25 and 26 are also proximal to the bearing 15 when disposed in the end 14 of the slot 13. The opposed wedgelike openings 25 and 26 radiate outwardly from the slot 13 towards the centerline 23 to provide surfaces 27 and 28, respectively. The surfaces 27 and 28 are spaced from a diameter D of the annular groove 16 and parallel to an imaginary line tangent to the annular groove 16 of the bearing at tangent points 29 and 31, respectively. The imaginary tangent lines at points 29 and 31 to the surfaces 27 and 28, respectively, are each spaced apart a given distance $s$ (see FIG. 6).

Figures 3, 4:
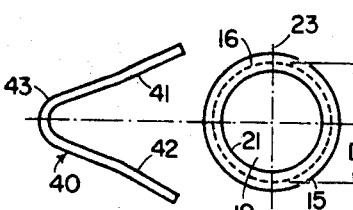
FIGS. 3—5 show the parts of the bearing device of FIG. 1 along a common line ready for assembly.
Figure 5:
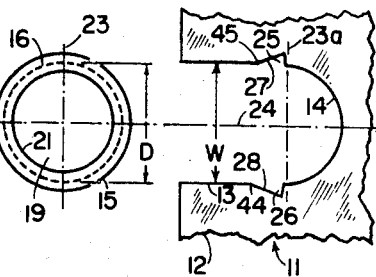

The bearing device 10 includes a resilient bifurcated spring member 40 branching out into two resilient levers 41 and 42 interconnected by a bridging portion 43 (FIG. 3). The spring member 43 may be made of suitable spring material, such as, phosphor bronze, steel, or the like and having a cross-sectional configuration that will fit into the area defined by the space between the parallel imaginary tangent lines at points 29 and 31 and surfaces 28 and 27, respectively, and the spaced apart wall portions 17 and 18. This cross-sectional configuration may, of course, be circular, rectangular or any expedient shape. The spring member 40, shown in FIGS. 1—3, 6 and 7, has a rectangular cross section area.

Figures 1, 2:
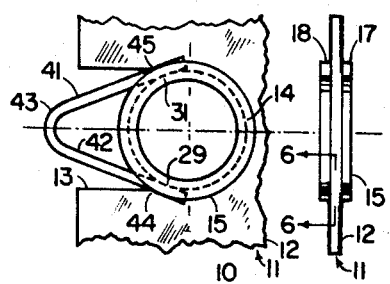
FIG. 1 is a side view of the bearing device in accordance with a preferred embodiment of the invention.
FIG. 2 is an end view of the bearing device shown in FIG. 1.

Referring particularly to FIGS. 1 and 6, the spring member 40 retains the bearing 15 longitudinally within the slot 13 at the end 14 thereof by a double-lever action in a manner to be explained now.

The levers 41 and 42 of the spring member 40 are normally biased in an outwardly direction when confined within the wedgelike openings 25 and 26, respectively. In this biased condition, the lever 42 coacts with the bearing support member 12 at the point of intersection 44 of the surface 28 and the slot 13 and on the bearing at the point of tangency 29 to urge the bearing into the end 14 and to retain the bearing 15 from moving longitudinally along the longitudinal axis 24 of slot 13. The point of intersection 44 acts as a fulcrum for the lever 42 while the bridging member 43 provides spring biasing force for applying a pivotal force on the lever 42 about the fulcrum or point 44. In a similar manner the lever 41 coacts with the bearing support member 12 at the intersection of the surface 27 and slot 13 and the bearing 15 at the point of tangency 31 to urge the bearing 15 into the end 14 and retain the bearing 15 within the end 14 of the slot 13. Thus, the levers 41 and 42 of the spring member 40 coact as double levers for retaining the bearing 15 within the slot 13 in the desired position at the end 14 of the slot 13. This feature of a double-lever action also eliminates any possible looseness or play between the bearing 15 and bearing support member 12 due to dimensional tolerance between the levers 41 and 42 and the wedgelike openings 25 and 26.

Referring now to FIG. 7, the frame 11 and bearing support member 12 are shown in greater detail for the accommodation of more than one bearing device 10. The bearing device 10 may be mounted edgewise in the bearing support member 12 as shown in FIGS. 1 and 2 or may be mounted internally by the arrangement shown in FIG. 7. The bearing support member 12 includes a keyhole slot 50 which differs from the slot 13 only in that there is a relatively larger opening 51 at one end thereof for receiving the bearing 15 and spring member 40. To assist the reader, elements of the slot 50 that correspond to the slot 13 have similar reference numerals except that a small letter *a* is added to the reference numerals. It should be understood that except for the relatively large opening 51, the slots 50 and 13 correspond to each other and retain the bearing 15 laterally in the same manner explained hereinbefore. It should also be understood that the slot 50 has opposed wedgelike openings 25a and 26a similar to wedgelike openings 25 and 26, respectively. The wedgelike openings 25a and 26a have surfaces 27a and 28a which also correspond to surfaces 27 and 28, respectively, of wedgelike openings 25 and 26. The spring 40 is shown in the normal position for retaining the bearing 15 within the slot 50. It should be noted that the diameter $Da$ of the end of the slot 14a is similar to the diameter $D$ of the annular groove 16 of the bearing 15. The end 51 of the slot 50 may be circular in shape and have a radius $R$ greater than the radius of the bearing 15 which radius extends from the center of the bearing 15 to the outermost edge of the wall portions 17 and 18 of the bearing 15 so that the bearing 15 may be inserted into the opening 51 and moved along longitudinal axis of the slot 50 to the end 14a of the slot 50.

FIG. 8 shows a section of the bearing support member 12 which section contains a slot 50, a split bearing 80 and a shaft 22. The split bearing 80 is shown by way of example that other bearing arrangements may be used wherein it may be more convenient to replace a split bearing 80 instead of a bearing such as the type illustrated for bearing 15. In all other respects, of course, the bearing device shown particularly in FIG. 8 is similar to the bearing device shown throughout FIGS. 1—7.

In the operation of the bearing device 10, the bearing 15 shown in FIG. 4 is inserted in the plane containing the slot 13 and the bearing 15 is moved to the end 14. The spring member 40 is then compressed by urging the levers 41 and 42 inwardly so as to enter the slot 13. The spring member 40 is then urged towards the bearing 15 and the end 14 of the slot 13 and is inserted between the wall portions 17 and 18 and into the wedgelike openings 25 and 26 on bearing support member 12. Upon release of the compressive force on the spring member 40, the levers 41 and 42 are biased in an outwardly direction and are pivoted at the fulcrum points 44 and 45 to coact with the bearing 15 at the tangency points 29 and 31 to urge and retain the bearing longitudinally in the end 14 of the slot 13. The wall portions 17 and 18 of the bearing 15 retain the spring member 40 within the wedgelike openings 25 and 26 laterally with respect to the bearing support member 12. The resilient levers 41 and 42 compensate for any manufacturing tolerance of the structural elements of the bearing device 10 by bending in the direction to eliminate such manufacturing tolerance buildup. Thus, the invention, hereinabove described, features a double-lever locking action. A single-lever action, of course, may be provided with only one of the levers 41 and 42 by the use of a single lever 41 or 42 biased outwardly to provide a pivotal force about fulcrum points 44 or 45, respectively.

It will be apparent that many changes and modifications of the several features described herein may be made without departing from the spirit and scope of the invention. It is, therefore, apparent that the foregoing description is by way of illustration of the invention rather than indicative of limitations of the invention.

What I claim is:

1. A bearing device for a frame having at least one bearing support member,
   a. said support member having a slot terminating at one end thereof;
   b. bearing means including sidewall portions for straddling said slot at said one end thereof;
   c. said support member having opposed wedgelike openings communicating with said slot proximal to said bearing means when said bearing means is disposed in said one end of said slot; and
   d. spring means having at least one resilient lever disposed between said sidewall portions in one of said wedgelike openings and coacting with said support member for retaining said bearing means in said slot.

2. The invention defined in claim 1 wherein said bearing means has a given centerline normal to a longitudinal axis of said slot and said opposed wedgelike openings are disposed above said centerline of said bearing means when said bearing means is disposed in said one end of said slot.

3. The invention defined in claim 1 wherein said spring means is a bifurcated member having first and second resilient levers normally biased outwardly in cooperative relationship with said wedgelike openings so as to coact with said support member for retaining said bearing means in said one end of said slot.